United States Patent Office 3,525,430
Patented Aug. 25, 1970

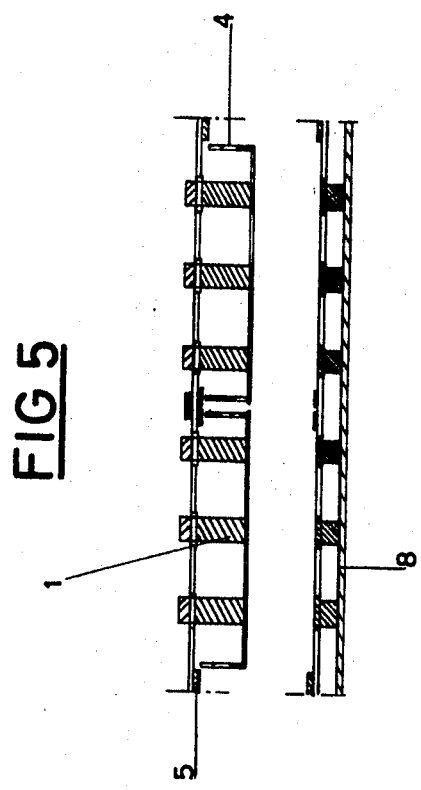
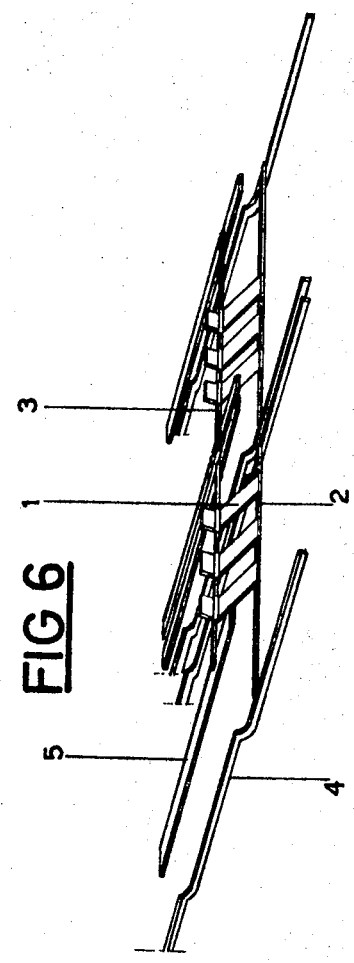
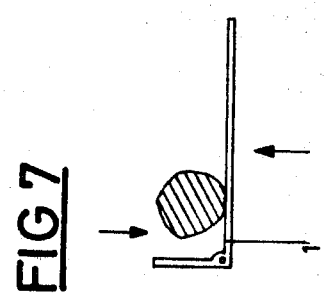

3,525,430
MACHINE FOR SIZING ELONGATED
VEGETABLE PRODUCTS
Yvon Bruel and Alain Bruel, both of Domaine du Petit
Chaumont 30, Aigues-Mortes, France
Filed Mar. 15, 1968, Ser. No. 713,399
Claims priority, application France, Mar. 23, 1967,
99,955
Int. Cl. B07b 13/04
U.S. Cl. 209—73                                    2 Claims

ABSTRACT OF THE DISCLOSURE

This disclosure concerns a machine for sizing elongated vegetable products particularly but not exclusively asparagus which is composed of an elongated frame having a product-receiving end and an opposite end; at least one pair of endless belts rotating about these ends; a plurality of shafts freely rotatably mounted at their extremities to the belts and extending transversely therebetween; at least two finger members coaxially mounted on each of the shafts and forming differently dimensioned product-supporting rows; each finger having a longitudinal longer part and a shorter vertical part, the shorter part being substantially perpendicular to the longer part at their junction point and being mounted at that point to the shaft; at least one pair of longitudinal cam sections extending parallel to the belts and outwardly spaced therefrom; the cam shaped sections having a plurality of deflection points starting from the product receiving end and rising gradually near the opposite end; a plurality of rods extending parallel to the shaft, each rod connecting the longitudinal parts of the fingers in each row; the rods having extremities resting on the cam sections, whereby upon rotation of the belts and passage of the connecting rods over the deflection points of the cam sections the fingers of each row successively pivot more so as to form a slot of a given size between the shaft thereof and the shaft of the preceding row of fingers thereby allowing passage therethrough of a product having this size but retaining larger products until said larger products encounter a larger dimensioned slot upon passing subsequent deflection points along the cam shaped sections.

---

This invention is concerned with a sizing device using an improved endless belt intended to size or calibrate asparagus while they move.

There are known sizing devices for vegetable products in particular for asparagus in which use is made of a distribution prism for the asparagus of support deflectors and of very narrow belts between which pass the asparagus according to their size.

These devices have disadvantages arising from the continuity of the sizing which gives sometimes very poor results as certain products have sizes falling in between the two limits for which these devices are set.

The present invention seeks to avoid these disadvantages by the rapid and controllable opening of a space through which only the products of the suitable size can pass. As this space opens more and more sizing takes place according to an increasing diameter of the asparagus.

The accompanying drawings represent a non-limiting example of the invention and only have for purpose to facilitate the operation of the machine.

FIG. 5 shows a cross section of the front view of two sizing belts.

FIG. 6 is a perspective view of a part of the device.

FIG. 7 shows in cross section seen from the side the product to be sized arranged on a transport element.

Figure 1:
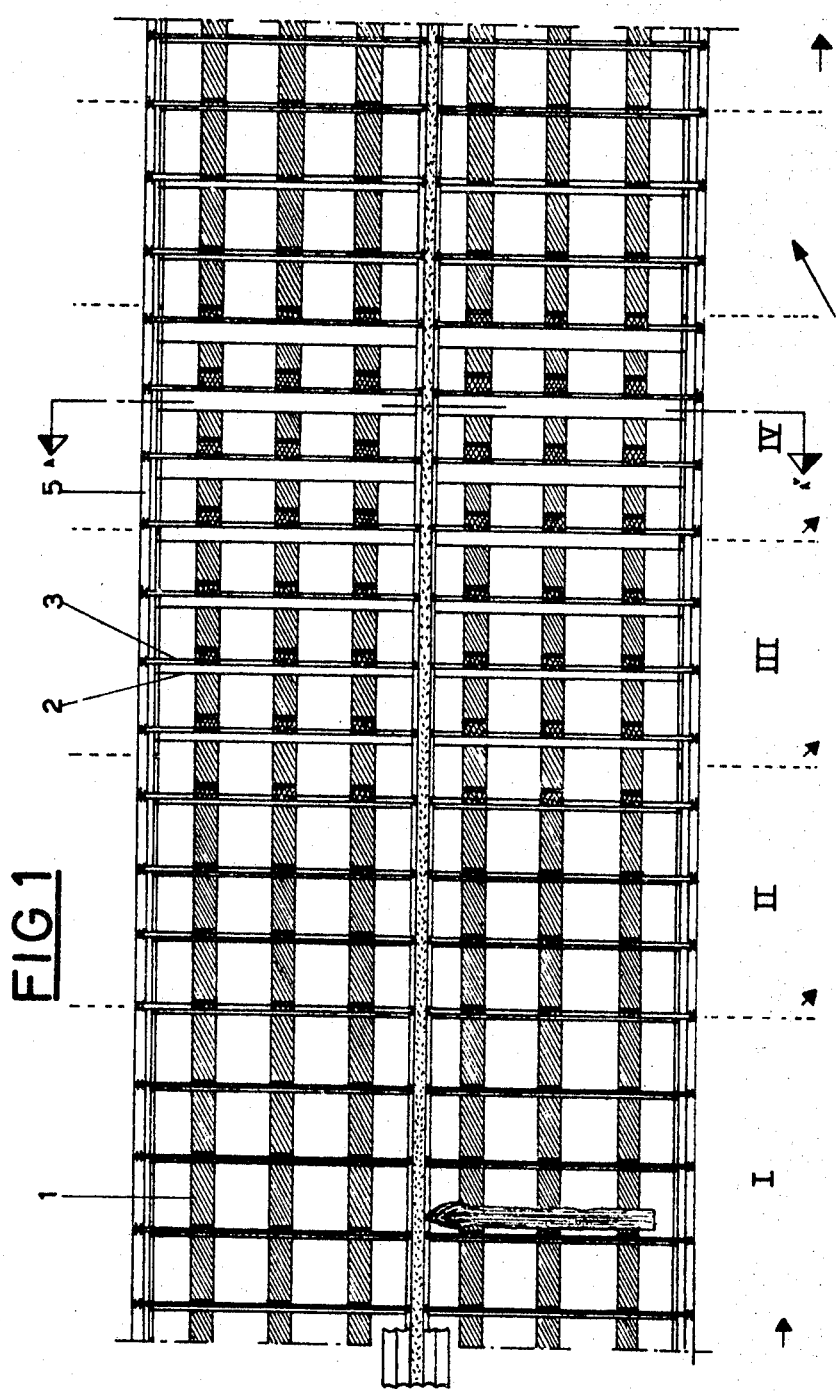
FIG. 1 is a top plan view of two sizing belts in accord with the present invention positioned on either side of a stop belt.

Referring to FIG. 1, the device in accord with the invention comprises an assembly of support fingers 1, preferably in the shape of an L, whose longest part is positioned horizontally in its normal position while the shorter part is vertically and upwardly positioned. These support fingers can have any width; often they can be as thin as a wire as long as they are capable of supporting the weight of the object to be sized. The carrying fingers 1 positioned along the same row are connected together at their horizontal extremity by connecting rod 2. The number of fingers connected together can vary: it is at least two fingers in order to maintain the object in two places, but the invention can also be carried out with three or several fingers for the same row.

A rotational shaft 3 parallel to connecting rod 2 also connects fingers 1 to the angle of the L in such a way that the rotation of fingers 1 takes place freely around this shaft. It is thus for example that a sleeve can be placed in the angle of the L, permitting to introduce this rotating shaft therein. Naturally other devices can also be used giving the same result.

Connecting rod 2 rests at its two extremities on a cam-shaped ramp 4, while the two extremities of the rotating shaft 3 are secured on two driving belts 5. These driving belts 5 support preferably at an equal distance all the rotating shafts of the assemblies of carrying fingers 1 in such a way that in normal position each finger can touch the previous finger by its horizontal extremity and be in the same manner in contact or nearly so with the extremity of the following finger.

Generally belts 5 are belts driven by two pulleys 6 (FIG. 2) one of which can be connected to a motor. In return position above the machine, a stop device can be positioned in order to prevent the different L's from balancing under the force of gravity; these might be incorrectly oriented upon their return to operating position.

Figure 3:
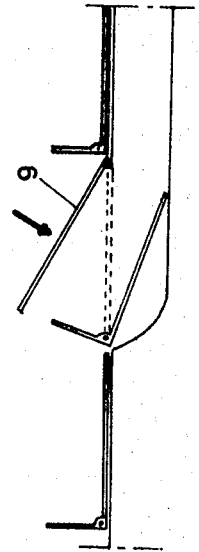
FIG. 3 is a schematic view of another device with double cam ramp sections.
Figure 4:
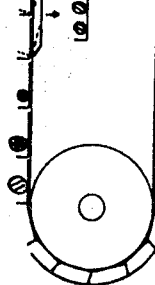
FIG. 4 is a schematic detail view showing branching towards one or the other of the ramps.

According to a modification shown on FIG. 3, the sizing machine can comprise two cam ramps 4 positioned one after the other. Referring to FIG. 4, branching towards one or the other cam ramp can be effected by means of a movable element 9. This movable element constitutes a part of a second ramp to which it is connected by hinges in order that when it is turned down thereby continuity with the cam-less part of the first ramp. Command of the movable elements can be carried out by an electro-magnet for example or by any other suitable means. A control button is then positioned near the work station of the operator who poses the products to be sized at the beginning of the belt.

The assembly of the belt being driven by one of the pulleys, the operator places the products to be sized on the carrying fingers 1. In the case of asparagus, the head is placed in contact with a foamed band 8, which may be fixed or driven in the same way as the belt. This foamed band 8 has for purpose to avoid damaging the fragile heads of the asparagus but it also serves to size the products to be sized according to a desired length. It is thus that if two tables are juxtaposed as in FIG. 1, it is possible to size the products according to the different positions of band 8 on the pulleys or on the band support 9. For asparagus, if a length of 22 cm. is desired on one of the belts of 24 cm. on the other belt, band 8 is then positioned on the corresponding pulley. If the same size of 22 cm. is desired on the same belts, an additional band can be added.

At the other end of the asparagus, at the side of the root, can be positioned a cutting device such as a saw or a knife. This device appears on the outside of the table between driving member 2 and rotating shaft 3 so that it can sharply cut the asparagus. Then it disappears under the table. Naturally a reciprocating vertical device has been provided to cut the root of the asparagus and any device capable of similarly doing can be used. Control can be manual but it can also be automatic and be programmed in such a way that the time of passage of the belt above the knife is not greater than the acting time of the knife itself.

Figure 2:
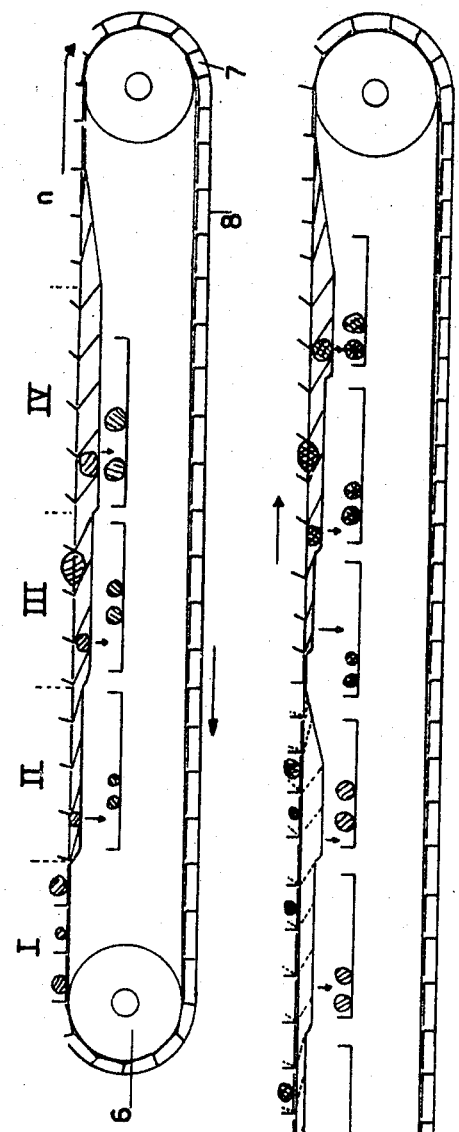
FIG. 2 shows a schematic view of the cam-shaped section arrangement.

In conformity with FIGS. 1 and 2, the product to be sized is in a first phase I positioned on the horizontal fingers 1 until the first deflection point or chute of the cam 4. On this cam, connecting rod 2 is slightly raised while belt 5 still drives rotating shafts 3. The different fingers 1 pivot slightly on their rotating shafts and cause a slot to appear between the rotating shaft and the rotating shaft of the previous fingers. This notch determines the calibre of the asparagus which can pass therethrough and fall in a receiving container if the calibre is that desired. If the product is too big, it remains blocked in the notch and stays in this position until in one of the following phases the notch has become big enough to let it pass through.

The number of phases has been shown here as 4, but it can naturally be much greater or smaller.

In a last phase, it is in phase n, the cam ramp goes up slightly to guide the fingers and bring them back into a substantially horizontal position as in the start of the operation in such a way that ramp 4 be about at the same height as belts 5.

Then the different fingers turn around a pulley and go under a guard 7 constituted by a plate 8 positioned under the fingers in such a way as to prevent these to bend under the action of gravity and to be properly oriented upon their return to the surface above pulley 6.

According to the modification of FIGS. 3 and 4, two successive cam ramps are used. This arrangement permits to differentiate between two kinds of products and then to calibrate these. For asparagus, it is possible in this way to separate for example white asparagus from violet asparagus. By the use of movable element 9, controlled by the operator it is possible to branch fingers 1 towards one or the other calibrating ramp. If at the first ramp violet asparagus are calibrated, the movable element 9 stays high. When the operator notices a white asparagus, she pushes the button to lower element 9. The fingers follow the same horizontal line and fall further in the cams of the second ramp.

In order to create a link between the two cam ramps, the support fingers having been introduced in the first ramp, come out at the extremity of this ramp by going up thanks to the special shape of said ramp towards the normal level in order to give a horizontal position to the fingers before these fall empty in the second ramp.

According to FIG. 7 and positioned preferably at the beginning of each sizing assembly, a device for washing asparagus is provided. For this transversal watering ramps, shown schematically by arrows, can be positioned above and below the sizing belt, but slightly shifted from one another by about the average thickness of an asparagus. Thus the pressure of the spray being sufficiently high, the sprays acts tangentially along the entire length of the asparagus in such a way that the lower and the upper spray having substantially the same pressure can create a couple or torque tending to make the asparagus turn on itself and thus be washed along its entire cylindrical surface.

For this reason it is preferable to have finger supports which are very thin in order not to interfere with washing of the product.

Naturally other modifications according to the present application could be shown but these would not add to the good understanding of the present invention.

What is claimed is:
1. Machine for sizing elongated vegetable products, in particular asparagus, comprising: an elongated frame having a product-receiving end and an opposite end; at least one pair of endless belts rotating about said ends; a plurality of shafts freely rotatably mounted at their extremities to said belts and extending therebetween; at least two finger members coaxially mounted on each of said shafts and forming differently-dimensioned product-supporting rows; said fingers comprising a longitudinal longer part and a shorter vertical part, said shorter part being substantially perpendicular to said longer part at their junction point and being mounted on said shaft at said point; at least one pair of longitudinal cam sections extending parallel to said belts and outwardly spaced therefrom, said cam sections having a plurality of successive deflection points starting from said product receiving end and rising gradually near said opposite end; a plurality of rods extending parallel to said shafts, each rod connecting longitudinal parts of said fingers in each row; said rods having extremities resting on said cam sections, whereby upon rotation of said belts and passage of said connecting rods over said deflection points of said cam sections of the fingers of each row successively pivot more and more so as to form a slot of a given size between the shaft thereof and the shaft of the preceding row of fingers thereby allowing passage therethrough of a product having said size but retaining larger products until said slot becomes larger upon passing subsequent deflection points along said cam sections thereby sizing said products according to their increasing size, and two pairs of endless belts positioned on each side of a belt of foamed material adapted to receive the head of the product to avoid damaging the same.

2. Machine according to claim 1, having two successive pairs of cam sections intermediate said ends, the gradually rising part of a first section being connected to the section before the first inflection point thereof, and having a control member intermediate said cam sections for directing said fingers to one of the other section.

References Cited
UNITED STATES PATENTS

| | | | |
|---|---|---|---|
| 1,617,096 | 2/1927 | Bell et al. | 134—131 X |
| 1,710,199 | 4/1929 | White | 209—84 |
| 3,206,024 | 9/1965 | Blake | 209—84 |

ALLEN N. KNOWLES, Primary Examiner

U.S. Cl. X.R.

209—84